United States Patent Office 2,956,998
Patented Oct. 18, 1960

2,956,998

ADENINE DERIVATIVES AND PROCESS
FOR PREPARING

Manuel M. Baizer, Union, N.J., assignor to S. B. Penick and Company, New York, N.Y., a corporation of Delaware No Drawing. Filed Nov. 7, 1957, Ser. No. 694,926

12 Claims. (Cl. 260—252)

This invention relates to an improvement in processes for the manufacture of 6-substituted-amino purine derivatives.

More particularly, the invention relates to an improved process for manufacturing 6-substituted amino purines having the formula:

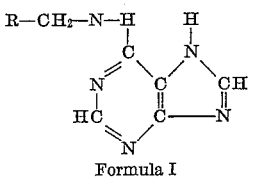

Formula I wherein R represents an organic radical. Several representative types of such products are known in the art.

These compounds are useful as growth stimulants for the normal growth of plants, for example, the compounds in which R stands for 2-furfuryl, benzyl, and thenyl, have proven highly effective in stimulating the budding of moss, as described by C. G. Skinner et al. (JACS, 77: 6693, 1955).

The invention also particularly relates to certain novel chemical compounds, 6-amido purines, including 6-(2'-furoylamino)-purine; 6 - [(alpha - carbonyl-thiophene-)-amino]-purine; 6-(o-methyl-benzoylamino)-purine; 6-(alpha - picolinoylamino) - purine; 6 - [(alpha - alpha-diphenylacetyl) - amino] - purine; 6 - [ - alpha'(alpha-naphthyl) - acetylamino] - purine; 6 - (alpha - naphthoyl-amino) - purine; 6 - [(alpha - phenylacetyl) - amino]-purine; 6-[(p - methoxybenzoyl) - amino] - purine; and 6 - [(6' - methoxy - 4' - carbonylquinolinyl) - amino]-purine. These amides are valuable intermediates in the process of the invention, whereby they are reduced to the 6-substituted amino purines of Formula I.

Some purine derivatives (I) have previously been synthesized by G. B. Elion et al. (JACS, 74: 411, 1952) from 6-mercaptopurine, which is an expensive initial material. It is transformed into 6-methylmercaptopurine and the latter is treated at an elevated temperature in a sealed tube with an amine whereby the purine derivatives (I) are obtained. This method is obviously impractical for technical purposes, and it is, therefore, an object of my invention, particularly in view of the aforementioned effectiveness of these purine derivatives as plant growth stimulants, to develop improved methods for making them.

I have now discovered that the purine derivatives (I) can be prepared smoothly by the reduction of purine derivatives which have the Formula 6-(R—CONH—) purine (II) wherein R has the above meaning. I have discovered that, instead of the expensive 6-mercaptopurine, I can employ as initial material in the synthesis of the compounds (I) the 6-aminopurine, commonly known as adenine, which is readily available from natural sources or may easily be prepared synthetically by several well-known methods. Although adenine is insoluble in most common solvents, it does dissolve in acid anhydrides upon warming and reacts in that solution to form an amide which can readily be isolated in the conventional manner (II). The crude reaction product is reduced to the purine derivatives (I) in the manner above indicated by mixing it with lithium aluminum hydride in a suitable solvent. The compounds (I) are easily isolated from the reaction mixture in the usual manner.

This smooth reduction of the amides (II) to the amines (I) in the presence of lithium aluminum hydride is surprising. Nystrom and Brown have stated (JACS 69: 1197–1199 at 1198, May 1947) that the "carbon-to-carbon double bond in certain unsaturated ketones, acids, nitro compounds and heterocyclic nitrogen compounds are hydrogenated" by this reducing agent, and it could therefore have been expected that the imidazo and/or pyrimidine rings of the purine derivatives (II) might be hydrogenated upon exposure to lithium aluminum hydride in my reduction process.

Baker et al., Journal of Organic Chemistry, volume 19, pages 631–660 (1954), show the reduction of an amido-pyrimidine derivative to an amino-pyrimidine without hydrogenation of the pyrimidine ring with lithium aluminum hydride (page 639, XV to XII). However, this is merely the reduction of a mono-nuclear compound.

With regard to the treatment of poly-nuclear compounds with lithium aluminum hydride, Bohlmann, Chemische Berichte, Jahrgang 85 (1952), discloses the hydrogenation of nuclear double bonds in polynuclear heterocyclic compounds containing ring nitrogen, for example, quinoline is reduced to dihydroquinoline; acridine is reduced to di-hydro acridine; quinoxaline is reduced to tetrahydroquinoxaline; and benzimidazole is reduced to dihydrobenzimidazole.

Further, Julian et al., JACS, 71: 3206, 1949, discloses that 1-methyl indole and 1,3-dimethylindole are reduced with lithium aluminum hydride in ether to the corresponding indolines.

These teachings of Bohlmann and Julian et al. would indicate that the purine nucleus would be hydrogenated by lithium aluminum hydride. However, I have discovered, as shown, that this is not the case and that the reduction to the purine derivatives (I) proceeds smoothly in the desired direction.

The fact that the amides (II) can readily be prepared from adenine adds greatly to the efficiency of my new manufacture of the purine derivatives (I), and that step is therefore a highly useful part of the manufacture. It is to be understood that the amides (II), when prepared from other initial materials by different methods, are equally useful for my new process of reducing them to the compounds (I).

The nature of the R radical in the intermediate amide (II) is unimportant save as it must be of a nature which forms a 6-substituted amido purine (II) which may be reduced to 6-substituted amino purine (I) with lithium aluminum hydride without hydrogenation of the purine nucleus. Thus, R may represent for example aliphatic moieties as methyl, ethyl, isopropenyl, et cetera; aromatic moieties as phenyl, ortho-tolyl, diphenyl-methyl, alpha-naphthyl methyl, alpha-naphthyl, phenyl-methyl, para-methoxy phenyl; heterocyclic moieties as 2'-furyl, alpha-thienyl, 2'-pyridyl, 6'-methoxy-4'-quinolinyl; and, cycloaliphatic radicals, as cyclopentyl and cyclohexenyl.

Adenine may be converted into the amides (II) by the use of an organic acid anhydride, such as, the anhydrides of acetic, benzoic, 2-furoic, alpha-thiophenecarboxylic, o-toluic, picolinic, diphenylacetic, alpha-naphthyl acetic, alpha-naphthoic, phenylacetic, p-methoxybenzoic, and quininic acids. The reduction of the amides (II) to the purine derivatives (I) gives the highest yield when conducted in organic liquids which are also solvents for the lithium aluminum hydride and are inert thereto under the reaction conditions, such as tetrahydrofurane, diethyl-, diisopropyl-, dibutyl ether, and the like. Reaction takes place at room temperature and is completed by refluxing, if necessary.

Thus, the present invention resides in the concept of a process for reducing 6-substituted amido purines to 6-substituted amino purines of Formula (I) and in the concept of certain novel 6-substituted amido purine compounds. The following examples illustrate my invention:

*Example 1.—Preparation of 6-(2'-furylamino)-purine*

Heat a mixture of 1.35 grams of adenine and 3.0 grams of 2-furoic anhydride in an oil bath at about 80 degrees centigrade for 1 hour and at about 140 degrees centigrade for 4 additional hours. A homogeneous liquid solution is obtained. Cool the solution, dilute with 20 milliliters of water and boil under reflux for 1 hour. Further dilute the warm solution with water, neutralize with sodium bicarbonate and chill. Remove the crystalline product by filtration, wash it with cool water and dry over phosphorous pentoxide. A yield is obtained of 1.78 grams, melting at 213.4–215 degrees centigrade corrected. Recrystallize an analytical sample of 6-(2'-furoylamino)-purine from water.

*Analysis.*—Calculated for $C_{10}H_7N_5$. ¾ $H_2O$: C, 49.46; H, 3.53; N, 28.86. Found: C, 49.91; H, 3.47; N, 28.49.

Add portionwise 1 gram of the above crude amide to a stirred suspension of 0.75 gram of $LiAlH_4$ in 70 milliliters of tetrahydrofuran. Stir for 4 hours at room temperature, then let stand unstirred for an additional 64 hours, and finally heat under reflux with stirring for an additional 2 hours. Destroy the excess reducing agent by cautious addition of water. Filter off the inorganic salts and wash the salts with tetrahydrofuran. Evaporate the organic solution formed from the filtrate and the washes in vacuo to form a residue. Crystallize the residue from alcohol to yield, in several crops, 0.48 gram 6-(2'-furylamino)-purine. Recrystallize from alcohol an analytical sample melting at (sealed tube) 270–272 degrees centigrade.

*Analysis.*—Calculated for $C_{10}H_9N_5$: C, 55.81; H, 4.03; N, 32.54. Found: C, 56.09; H, 4.15; N, 32.32.

The purified sample shows a maximum in the ultraviolet at 268 m$\mu$ (E=18,706) and a minimum at 234 m$\mu$ (E=3161).

*Example 2.—Preparation of 6-benzylaminopurine*

Heat gently a mixture of 1.0 gram of adenine and 2.25 grams of benzoic anhydride. When a homogeneous solution is formed, heat for an additional 30 minutes to solidify the mixture. Add water and heat the mixture under reflux for 30 minutes. Neutralize with sodium bicarbonate and chill. Filter the crystalline reaction product. Wash the crystals with water and dry at 100 degrees centigrade. The yield of 6-benzoylaminopurine is 1.65 grams, melting at 229–232 degrees centigrade. Recrystallize an analytical sample from alcohol, melting at 242–243 degrees centigrade corrected.

Calculated for $C_{12}H_9ON_5$: C, 60.24; H, 3.79; N, 29.27. Found: C, 60.47; H, 3.75; N, 29.32.

Reduce the amide with $LiAlH_4$ by the procedure described under Example 1. The product, 6-benzylaminopurine, melts at 232.5 degrees centigrade, corrected. It can be recrystallized from water or dilute alcohol.

Calculated for $C_{12}H_{11}N_5$: C, 63.98; H, 4.92; N, 31.09. Found: C, 64.15; H, 5.00; N, 31.03.

*Example 3.—Preparation of 6-ethylaminopurine*

Reduce 6-acetylaminopurine with $LiAlH_4$ by the general procedure described in Example 1. Recrystallize the product, 6-ethylaminopurine, from water. The purified product melts at 237–237.5 degrees centigrade, corrected.

Calculated for $C_7H_9N_5$: C, 51.51; H, 5.58; N, 42.92. Found: C, 51.47; H, 5.40; N, 42.98.

*Example 4.—Preparation of 6-[(alpha-thienylmethyl)-amino]-purine*

Mix well 5.00 grams of the anhydride of alpha-thiophenecarboxylic acid with 1.89 grams of adenine. Heat the mixture on an oil bath maintained at a temperature of about 140 degrees centigrade. At 125–135 degrees centigrade the mixture becomes fluid and solidifies after about 30 minutes. Continue heating for an additional 2 hours at about 140 degrees centigrade, cool the reaction product, break it up, add about 70 milliliters of water and heat under reflux. Cool the product, treat it with excess sodium bicarbonate and filter. Wash the crude crystals of amide product, 6[(alpha-carbonyl-thiophene)-amino]-purine, and dry. The yield is 3.85 grams melting at 253 degrees centigrade uncorrected. Recrystallize an analytical sample from glacial acetic acid, which will yield a product melting at 248.5–249.5 degrees centigrade corrected.

Calculated for $C_{10}H_7N_5SO$: C, 48.97; H, 2.88; N, 28.56. Found: C, 48.78; H, 2.88; N, 28.40.

Dissolve 0.34 gram (0.009 mole) $LiAlH_4$ in 10 milliliters of tetrahydrofuran by stirring in a 20-milliliter 3-necked flask equipped with a reflux condenser and mechanical stirrer. Add to this solution 2.00 grams (0.00815 mole) of the intermediate amide in small portions. After the initial vigorous reaction is completed, allow the mixture to stir overnight. Add an additional 5 milliliters of tetrahydrofuran, stir the mixture at reflux temperature for 90 minutes and cool. Add water to decompose the excess hydride. Extract the residual solid hydroxides several times with boiling tetrahydrofuran. Recover 0.6 gram of crude product from the extract. Recrystallize the crude product from alcohol and dry at 100 degrees centigrade to recover a purified product, 6-[(alpha-thienylmethyl)-amino]-purine, melting at 249–249.5 degrees centigrade corrected.

*Analysis.*—Calculated for $C_{10}H_9N_5S$: C, 51.93; H, 3.92; N, 30.28. Found: C, 52.28; H, 3.75; N, 30.52.

Obtain additional product by extraction of the solid hydroxides with hot ethanol.

*Example 5.—Preparation of 6-[(o-methylbenzyl)-amino]-purine*

Mix well 5.08 grams o-toluic anhydride with 1.80 grams adenine and heat on an oil bath at about 140 degrees centigrade. After 2 hours the mixture becomes homogeneous and during the next 4 hours a solid precipitates. Follow the isolation procedure that is described in Example 4. The crude product, 6-[(o-methylbenzoyl)-amino]-purine, weighs 3.9 grams. Recrystallize an analytical sample from alcohol and dry at 100 degrees centigrade in vacuo to yield a purified product melting at 194.2–194.8 degrees centigrade, corrected.

*Analysis.*—Calculated for $C_{13}H_{11}N_5O$: C, 61.63; H, 4.38; N, 27.66. Found: C, 61.78; H, 4.55; N, 27.79.

Dissolve 0.31 gram (0.00817 mole) of $LiAlH_4$ in 10 milliliters of tetrahydrofuran by stirring in a 20 milliliter 3-necked flask equipped with a reflux condenser and a mechanical stirrer. To this solution add 1.91 grams (0.0074 mole) of the intermediate amide. The mixture becomes very thick after the initial exothermic reaction. After stirring for 30 minutes, allow the mixture to stand overnight. Then stir at reflux temperature for 2 hours and cool. Next, add sufficient water to react with the excess hydride and filter the mixture to separate solid hydroxide residue. Extract the solid hydroxide residue with two 25 milliliter portions of boiling alcohol and concentrate the extract to dryness leaving a solid. Triturate the solid with ethyl acetate, with resultant crystallization. Filter the crystals to obtain 1.1 gram of the crude product. Recrystallize the crude product from 20 milliliters of absolute alcohol to recover 0.32 gram of mixture melting at 214.9–216 degrees centigrade corrected. Dissolve a sample in a slight excess of dilute sodium hydroxide and precipitate the free base by carefully neutralizing to pH 8 with HCl. This product melts at 241–243 degrees centigrade corrected.

Recrystallize the product from 95 percent alcohol and dry at 140 degrees centigrade/1 mm. The purified product, 6-[(o-methylbenzyl)-amino]-purine melts at 243.6–244.6 degrees centigrate.

Analysis.—Calculated for $C_{13}H_{13}N_5$: C, 65.25; H, 5.48; N, 29.40. Found: C, 65.41; H, 5.41; N, 29.29.

*Example 6.—Preparation of 6-[(2-pyridylmethyl)-amino]-purine*

Prepare picolinic anhydride by adaptation of the method of Schrecker and Maury, JACS, 76: 5803 (1954).

Dissolve approximately 5 grams of crude picolinic anhydride in 30 milliliters of dry xylene. Stir the solution and add 1.5 grams of adenine. Hold the reaction mixture at reflux temperature for 1 hour to form a precipitate. Thereafter treat the oily precipitate in water with a slight excess of sodium bicarbonate. Then wash the precipitate well with water to recover 2.03 grams of crude amide. Recrystallize the crude amide from methanol to achieve a yield of 6-(alpha-picolinoylamino)-purine melting at 285–286.2 degrees centigrate, corrected.

Analysis.—Calculated for $C_{11}H_8N_6O$: C, 54.96; H, 3.36; N, 34.99. Found: C, 55.53; H, 3.33; N, 35.19.

Add 1.82 gram (0.0076 mole) of 6-(alpha-picolinoylamino)-purine to a solution of 0.635 gram (0.167 mole) of $LiAlH_4$, in 50 milliliters of tetrahydrofuran. Stir the solution in an ice bath during the foregoing addition and then allow to stir at room temperature for the subsequent 66 hours. Thereafter decompose the $LiAlH_4$ with 1 milliliter of ethylacetate followed by 1 milliliter of water to form solid hydroxides. Extract the solid hydroxides with boiling ethanol. Dissolve the residue remaining after extraction in water and neutralize the solution to pH 8 with dilute sulfuric acid. Evaporate the water completely from the solution and take up the residue remaining after evaporation in absolute alcohol. Remove the insoluble $Li_2SO_4$ by filtration. Concentrate the solution to achieve a yield from the alcohol of 0.35 gram of crude product melting at 225–235 degrees centigrade. Recrystallize the product from alcohol to yield a purified base melting at 236–238 degrees centigrade with decomposition (capillary melting point). This is the product 6-[(2-pyridylmethyl)-amino]-purine.

This product shows no depression in melting point when mixed with an authentic sample of 6-[(2-pyridylmethyl)-amino]-purine. (JACS, 77: 6693, 1955.)

In the following Examples 7 through 12, employing the following general procedures in the reductions and isolations of products:

Add the amide in portions to the $LiAlH_4$ solution in tetrahydrofuran. Stir for 1–1.5 hours and then allow to stand overnight. Thereafter heat the mixture under reflux for 1.5 hours, and then cool. Thereafter destroy the excess hydride by the addition of ethylacetate and water. Filter off the salts and wash them with tetrahydrofuran. Dry the salts in air and then extract the salts overnight with alcohol in Soxhlet apparatus. Meanwhile, heat the filtrate from the salts to filter out the solvents and replace the distilled solvents with water. Add this aqueous solution (or a suspension) to the residue obtained by taking to dryness the alcoholic Soxhlet extracts. Neutralize the (alkaline) solution of the product to pH 7.5–8 precipitating the crude product. Purify further as noted in the individual examples.

*Example 7.—Preparation of 6-[(beta-diphenylethyl)-amino]-purine*

Mix well 12.18 grams of diphenylacetic anhydride with 2.89 grams of adenine and heat in an oil bath at about 140 degrees centigrade for 6 hours. Isolate the crude amide in a yield of 9.65 grams according to the procedure of Example 1. Recrystallize the crude amide first from acetone and then from glacial acetic acid to achieve a purified amide, 6-[(alpha, alpha-diphenylacetyl)-amino]-purine, melting at 245.5–246 degrees centigrade.

Analysis.—Calculated for $C_{19}H_{15}ON_5$: C, 69.28; H, 4.59; N, 21.27. Found: C, 69.63; H, 4.41; N, 20.80.

Reduce 5 grams of the amide using 198 milliliters of a solution containing 1.44 grams of $LiAlH_4$ in tetrahydrofurane. The crude product weighs 4.18 grams (87.5 percent). Recrystallize 2–3 times from 80 percent alcohol to achieve an analytical sample of 6-[(beta, beta-diphenylethyl)-amino]-purine melting at 233.6–233.8 degrees centigrade.

Analysis.—Calculated for $C_{19}H_{17}N_5$: C, 72.36; H, 5.43; N, 22.21. Found: C, 72.41; H, 5.43; N, 22.61.

*Example 8.—Preparation of 6-[(2'-alhpa-naphthylethyl)-amino]-purine*

Heat 9.65 grams of alpha-naphthlacetic anhydride under reflux for 4 hours with 2.63 grams of adenine in 100 milliliters of dry xylene. Filter the hot reaction product. Chill the filtrate thus obtained to deposit a solid. Boil the solid with water to dissolve. Cool the solution and treat with excess sodium bicarbonate to precipitate a solid. Finally filter the solid, wash and dry to yield 2.47 grams of crude amide. Recrystallize the crude amide twice from glacial acetic acid to provide the analytical sample of 6 - [alpha'(alpha - naphthyl)-acetylamino]-purine.

Analysis.—Calculated for $C_{17}H_{13}ON_5$: C, 67.31; H, 4.32; N, 23.09. Found: C, 67.53; H, 4.43; N, 23.15.

Reduce 5 grams of the amide by 1.57 grams of $LiAlH_4$ in 215 milliliters of tetrahydrofuran. The crude amine forms and weighs 4.10 grams (86.2 percent). Recrystallization of the crude amine from alcohol yields the purified amine, 6-[(2'-alpha-naphthyl-ethyl)-amino]-purine, melting at 232.5–233 degrees centigrade.

Analysis.—Calculated for $C_{17}H_{15}N_5$: C, 70.57; H, 5.22; N, 24.21. Found: C, 70.66; H, 5.34; N, 23.77.

*Example 9.—Preparation of 6-[(alpha-naphthylmethyl)-amino]-purine*

Prepare the crude amide from 11.40 grams of alpha-naphthoic anhydride and 3.38 grams of adenine according to the procedure of Example 8. The crude amide weighs 5.95 grams. Recrystallize the crude amide first from isopropanol and then from methanol to yield the analytical sample of 6-(alpha-naphthoylamino)-purine melting at 246–247 degrees centigrade.

Analysis.—Calculated for $C_{16}H_{11}ON_5$: C, 66.42; H, 3.83; N, 24.21. Found: C, 66.59; H, 3.92; N, 23.94.

From 2.50 grams of the amide and 0.82 grams of $LiAlH_4$, produce the crude amine weighing 1.58 grams (66.4 percent). Recrystallize the crude amine from 90 percent alcohol to yield a product, 6-[(alpha-naphthylmethyl)-amino]-purine, melting at 258–258.5 degrees centigrade.

Analysis.—Calculated for $C_{16}H_{13}N_5$: C, 69.80; H, 4.76; N, 25.44. Found: C, 69.76; H, 4.60; N, 25.45.

*Example 10.—Preparation of 6-[(beta-phenylethyl)-amino]-purine*

Prepare the crude amide from 4.25 grams adenine and 11.2 grams phenylacetic anhydride according to the procedure of Example 8. The crude amide weighs 6.7 grams. Recrystallize the crude amide from methanol to yield a product, 6-[(alpha-phenylacetyl)-amino]-purine, melting at 247–249 degrees centigrade.

Analysis.—Calculated for $C_{13}H_{11}ON_5$: C, 61.65; H, 4.38; N, 27.66. Found: C, 61.85; H, 4.34; N, 27.72.

Reduce 3.00 grams of the amide with 1.13 grams of $LiAlH_4$ in 155 milliliters of tetrahydronfuran to yield 2.53 grams (89.2 percent) of crude amine. Recrystallize the crude amine from 80 percent ethanol to achieve a purified product, 6-[(beta-phenylethyl)-amino]-purine, melting at 243.7–244.2 degrees centigrade.

*Analysis.*—Calculated for $C_{13}H_{13}N_5$: C, 65.25; H, 5.48; N, 29.27. Found: C, 65.53; H, 5.32; 29.15.

*Example 11.—Preparation of 6 - [(p-methoxybenzyl)-amino]-purine*

React 20.6 grams of p-methoxybenzoic anhydride with 6.8 grams adenine according to the procedure of Example 8 to yield 11.5 grams (84.9 percent) of crude amide, melting at 186–189 degrees centigrade. Recrystallize the crude amide from alcohol to achieve the purified amide 6-[(p-methoxybenzoyl)-amino]-purine, having a raised melting range of 189.5–191 degrees centigrade.

*Analysis.*—Calculated for $C_{13}H_{11}O_2N_5$: C, 57.99; H, 4.09; N, 26.02. Found: C, 58.00; H, 4.37; N, 25.99.

Reduce 5.00 grams of the amide with 1.765 grams of $LiAlH_4$ in 242 milliliters of tetrahydrofuran to yield 2.27 (48.0 percent) of the crude amine melting at 231–231.6 degrees centigrade. Recrystallize the crude amine from 50–60 percent alcohol to yield a product, 6-[(p-methoxybenzyl)-amino]-purine, having a raised melting range of 236.5–237 degrees centigrade.

*Analysis.*—Calculated for $C_{13}H_{13}ON_5$: C, 61.16; H, 5.13; N, 27.44. Found: C, 61.28; H, 4.84; N, 27.61.

*Example 12: Preparation of 6-[(6'-methoxy-4-quinolinyl-methyl)-amino]-purine*

Heat 20.3 grams of quininic acid with 40 milliliters of thionyl chloride in 45 milliliters of dry benzene under reflux for 3 hours. Remove the benzene solvent and excess thionyl chloride by distillation. Heat the residue remaining after distillation with 240 milliliters of dry diisopropyl-benzene, first to about 130 degrees centigrade and then to reflux. Cool the mixture and filter rapidly. Add 12.1 grams of dry potassium quininate to the filtrate. Stir this mixture for 1 hour at about 140 degrees centigrade. Do not isolate the quininic anhydride. Add 4.5 grams adenine and form the amide according to the procedure previously described. The crude amide weighs 7.37 grams. Recrystallize the crude amide from glacial acetic acid to yield the purified amide, 6-[(6'-methoxy-4'-carbonyl-quinolinyl)-amino]-purine, melting at 279–281 degrees centigrade.

*Analysis.*—Calculated for $C_{16}H_{12}O_2N_6$: C, 59.99; H, 3.78; N, 26.24. Found: C, 60.19; H, 3.91; N, 25.92.

Reduce 2.50 grams of the amide using 0.74 gram of $LiAlH_4$ in 102 milliliters of tetrahydrofuran. The crude product weighs 1.89 grams (79.0 percent). Purify by repeatedly dissolving the amine in dilute HCl and reprecipitating by adding sodium bicarbonate. The purified product, 6 - [(6' - methoxy-4'-quinolinylmethyl)-amino]-purine, melts at 292.5–293 degrees centigrade.

*Analysis.*—Calculated for $C_{16}H_{14}ON_6$: C, 62.73; H, 4.61; N, 27.44. Found: C, 62.56; H, 4.62; N, 27.21.

This application is a continuation-in-part of Baizer application Serial 564,862, filed February 13, 1956 and now abandoned.

While the invention has been illustrated with specific examples, it is limited only by the scope of the subjoined claims.

I claim:

1. The process of claim 5 wherein tetrahydrofuran is employed as the solvent.

2. A process for the manufacture of a purine derivative of the formula 6-(R—$CH_2$—NH)-purine wherein R is a radical selected from the group consisting of 2 furyl; phenyl; methyl, alpha-thienyl; o-methylphenyl; 2-pyridyl; beta, beta - diphenylmethyl; alpha - naphthylmethyl; alpha-naphthyl; phenylmethyl; p-methoxy-phenyl; 6-methoxy-4-quinolinyl, which comprises the steps: reacting 6-aminopurine with an acid anhydride with warming; isolating the crude reaction product 6-(R—CONH)-purine wherein R has the above meaning; mixing said product with lithium aluminum hydride in an inert organic solvent; and, isolating the 6-(R—$CH_2$NH)-purine from the reaction mixture.

3. The process of claim 2 wherein the acid anhydride is 2-furoic anhydride and the solvent for the lithium aluminum hydride is tetrahydrofuran.

4. The process of claim 2 wherein the acid anhydride is benzoic anhydride and the solvent for the lithium aluminum anhydride is tetrahydrofuran.

5. A method for the manufacture of a purine derivative of the formula 6-(R—$CH_2$—NH)-purine wherein R is a radical selected from the group consisting of loweralkyl, phenyl and furyl which comprises reducing a purine derivative of the formula 6-(R—CONH)-purine wherein R has the above meaning, with lithium aluminum hydride in an inert organic solvent and isolating the $$6-(R—CH_2—NH)$$

purine thus produced.

6. A process for the manufacture of a purine derivative of the formula 6-(R—$CH_2$—NH)-purine wherein R is a radical selected from the group consisting of 2-furyl; phenyl; methyl; alpha-thienyl; o-methylphenyl, 2-pyridyl; beta, beta-diphenylmethyl; alpha-naphthyl-methyl; alpha-naphthyl; phenylmethyl; p-methoxy-phenyl; and 6-methoxy-4-quinolinyl, which comprises the steps: mixing a purine derivative of the formula 6-(R—CONH)-purine, wherein R has the above meaning, with lithium aluminum hydride in an inert organic solvent; and, isolating the 6-(R—$CH_2$NH)-purine from the reaction mixture.

7. A composition of matter having the formula 6-(RNH)-purine where R is a radical selected from the group consisting of 2-furoyl; alpha-carbonyl-thiophene; alpha, alpha-diphenylacetyl; alpha-picolinoyl; (alpha-naphthyl) acetyl; alpha-naphthoyl; and, 6-methoxy-4-carbonyl-quinolinyl.

8. 6-(2'-furoylamino)-purine.

9. 6 - [(6' - methoxy-4'-carbonyl-quinolinyl)-amino]-purine.

10. 6-(alpha-naphthoylamino)-purine.

11. 6-[alpha'(alpha-naphthyl) acetylamino]-purine.

12. 6-(alpha-picolinoylamino)-purine.

References Cited in the file of this patent

Skinner et al.: Jour. Amer. Chem. Soc., vol. 77, pp. 6692–3 (1955).

Davoll et al.: Jour. Amer. Chem. Soc., vol. 73, pp. 1650–5 (1951).

Bohlmann: Chemische Berichte, vol. 85, pp. 390–4 (1952).

Julian et al.: Jour. Amer. Chem. Soc., vol. 71, pp. 3207–3210 (1949).

Fieser et al.: Organic Chemistry, pp. 226–7, second edition (1950).